United States Patent
Kuki et al.

(10) Patent No.: US 7,225,225 B2
(45) Date of Patent: May 29, 2007

(54) SELECTIVE SYNCHRONIZATION OF WEB BROWSERS

(75) Inventors: Hikaru Kuki, Nara (JP); Atsushi Ishii, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 837 days.

(21) Appl. No.: 09/823,210

(22) Filed: Mar. 30, 2001

(65) Prior Publication Data

US 2002/0143859 A1 Oct. 3, 2002

(51) Int. Cl.
*G06F 15/16* (2006.01)
(52) U.S. Cl. .................. 709/205; 709/248; 715/751
(58) Field of Classification Search ............... 709/203, 709/204–205, 238, 245, 246, 250, 219, 227, 709/218, 223, 224, 201, 248; 707/10, 201; 715/751, 500.1
See application file for complete search history.

(56) References Cited

U.S. PATENT DOCUMENTS

| 5,801,689 | A | | 9/1998 | Huntsman |
| 5,822,539 | A | | 10/1998 | Van Hoff |
| 5,826,025 | A | | 10/1998 | Gramlich |
| 5,861,883 | A | | 1/1999 | Cuomo et al. |
| 5,862,330 | A | | 1/1999 | Anupam et al. |
| 5,918,009 | A | | 6/1999 | Gehani et al. |
| 5,941,957 | A | | 8/1999 | Ingrassia, Jr. et al. |
| 5,944,791 | A | | 8/1999 | Scherpbier |
| 5,951,643 | A | | 9/1999 | Shelton et al. |
| 5,951,652 | A | | 9/1999 | Ingrassia, Jr. et al. |
| 5,954,798 | A | * | 9/1999 | Shelton et al. ............. 709/224 |
| 5,956,027 | A | | 9/1999 | Krishnamurthy |
| 6,151,622 | A | * | 11/2000 | Fraenkel et al. ............ 709/205 |
| 6,230,171 | B1 | | 5/2001 | Pacifici et al. |
| 6,233,600 | B1 | | 5/2001 | Salas et al. |
| 6,240,444 | B1 | * | 5/2001 | Fin et al. ..................... 709/205 |
| 6,353,851 | B1 | * | 3/2002 | Anupam et al. ............ 709/204 |
| 6,360,250 | B1 | | 3/2002 | Anupam et al. |
| 6,463,149 | B1 | * | 10/2002 | Jolissaint et al. ...... 379/265.09 |
| 6,871,213 | B1 | * | 3/2005 | Graham et al. ............. 709/205 |
| 6,938,212 | B2 | * | 8/2005 | Nakamura ................... 715/748 |
| 6,976,094 | B1 | * | 12/2005 | Dalrymple et al. ......... 709/248 |
| 7,143,342 | B1 | * | 11/2006 | Baweja et al. .............. 715/513 |
| 2004/0100507 | A1 | * | 5/2004 | Hayner et al. .............. 345/855 |

OTHER PUBLICATIONS

Webline Web conferencing (http://www.webline.com/) 1999.
WebEX technology (http://www.webex.com) at least one year prior to filing.
PlaceWare Microsoft Office Live Meeting (http://www.placeware.com/products/index.html), at least one year prior to filing.

(Continued)

*Primary Examiner*—Abdullahi Salad
(74) *Attorney, Agent, or Firm*—Chernoff, Vilhauer, McClung & Stenzel

(57) ABSTRACT

A web browser and browser method permit the display of web pages and dynamic effects related to displayed objects to be selectively synchronized for a plurality of browsers. A location attribute can be used to identify a browser at which an action is initiated and specify one or more browsers to display the results of the initiated action.

19 Claims, 4 Drawing Sheets

OTHER PUBLICATIONS

The Internet conference System (http://www.contigo.com/products.html) 1998.

Highlights for NetMeeting, Microsoft Corporation (http://support1.microsoft.com/support/NetMeeting).

"Data protocols for multimedia conferencing," SERIEST: Terminal Equipments and Protocols for Telematic Services, ITU-T Recommendation T-120, Jul. 1996.

"ECMAScript Language Specification," ECMA Standardizing Information and Communication Systems, Standard ECMA—262, $3^{rd}$ Edition, Dec. 1999.

WebEx Meeting Center Features, wysiwyg://214/http://www.webex.com/home/services_mtgctr2.html, 2001, pp.1-2.

Cisco Web Collaboration, http://www.cisco.com/warp/public/180/collaboration/datasheets/WebCollab.pdf, Jan. 2000, pp. 1-3.

* cited by examiner

| Location Attribute | Function Description | Attribute Modified |
|---|---|---|
| on_local_<br>on_remote_<br>on_both_ | Specifies location of an action | onmousedown<br>onmouseover<br>onmouseout<br>onmove<br>onclick |
| wcurser='originator' | Specifies location of originator of an event | N/A |
| remote_target='frame name'<br>local_target='frame name' | Target frame location and selection | target='frame name' |
| wc="local"<br>wc="remote"<br>wc="both" | Location of document loaded by hyperlink | N/A |

FIG. 4

SELECTIVE SYNCHRONIZATION OF WEB BROWSERS

CROSS-REFERENCE TO RELATED APPLICATIONS

Not applicable.

BACKGROUND OF THE INVENTION

The present invention relates to World-Wide Web (web) browsers and, more particularly, to a system for selectively synchronizing the display and manipulation of web pages and other objects by a plurality of web browsers.

The World Wide Web (the "web") is a system of Internet servers that supports hypertext and the hypermedia extension (collectively, "hypertext"). Hypertext is a database system that can be used to link software objects by including in an object a pointer to another object. Hypertext is used to link text, sounds, images, programs, and other software objects. The web is typically accessed with a web browser, a computer program that fetches and displays objects, including web documents or pages formatted with HTML (Hypertext Markup Language) or XML (eXtended Markup Language). Specially formatted text or icons (hyperlinks or links) in the web page are hypertext pointers to other objects. A user can cause the browser to display another object by selecting the appropriate link. In addition, a browser can display dynamic effects produced by manipulation of software objects (such as a change in text color) upon the occurrence of an event specified in the displayed page (for example, movement of a cursor). Web browsers also typically include search capabilities to facilitate locating web pages of interest to the user. While the web potentially links millions of individual users and millions of documents, historically the model of the web has been that of the individual user searching out and displaying documents of interest to that user.

Synchronization technology has been developed to facilitate collaborative use of the web by groups of users. Page and object synchronization permits a plurality of web browsers engaged in a synchronized session to simultaneously display the same web page and the results of an action manipulating a displayed object. Synchronized page display and interaction with objects are bases of web conferencing services and are potentially valuable tools for e-commerce. For example, a buyer and a seller can simultaneously view the same product specifications or other commercial documentation.

While page and object synchronization facilitates global display of web pages and other objects, there are circumstances where it is desirable that certain actions be limited to a subset of users in the session. For example, during an e-commerce session a sales agent may wish to refer to a proprietary price list without disclosing the document to the potential purchaser. However, if the price list is opened on the agent's page-synchronized browser it will be displayed on the synchronized display of the purchaser's browser. On the other hand, the agent may wish to open an explanatory document in a window or frame for viewing by the purchaser. However, page synchronization does not support the use of frames. If one member of a session selects a hyperlink to load a new page into a frame displayed by a first web browser, the page will not necessarily be loaded in the proper frame on the remaining browsers of the session.

Likewise, object synchronization permits one user to cause an action manipulating a displayed object to be replicated on the browsers of the other users in the synchronized session. For example, a script language can be used to specify the occurrence of an action (such as, a change in text color) upon the happening of an event (such as, a mouse click) associated with an object (a section of text). When a first web browser of the synchronized session detects the event, it signals the other browsers of the session to display the same action as if the local user has instigated the event. However, it may be desirable that the action be initiated or displayed on a limited set of browsers of the session. For example, the sales agent may wish to display a message on a customer's remote display in response to a mouse click on the agent's local display without displaying the message locally.

What is desired, therefore, is a system to control object and page synchronization permitting user inputs at selected browsers engaged in a synchronized session to manipulate and display pages and other objects on a subset of the browsers of the session.

BRIEF DESCRIPTION OF THE DRAWINGS

FIG. 4 is a tabulation of exemplary location attributes and corresponding functions for selective synchronization of web browser events.

DETAILED DESCRIPTION OF THE INVENTION

Figure 1:
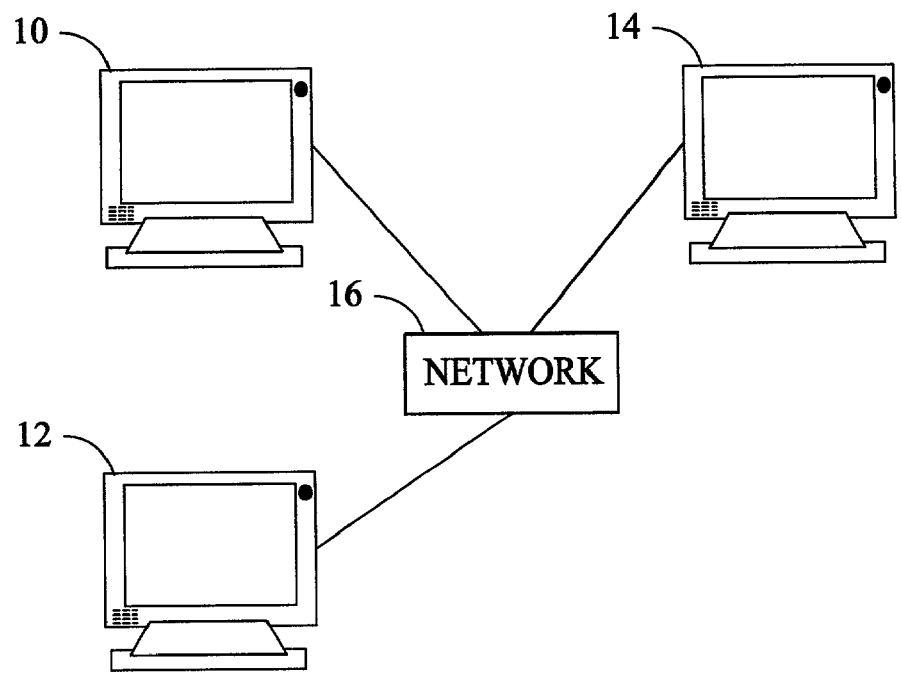
FIG. 1 is a schematic illustration of a synchronized web browsing session.

Referring to FIG.1, a typical synchronized World Wide Web ("web") session comprises a plurality of remote user data processing devices 10, 12, and 14 connected to the Internet 16, a network of interconnected servers and terminals. Typically, the user devices 10, 12, and 14 are equipped with a web browser that permits the user to search for data files or web pages stored on the Internet and to retrieve and display selected pages. Synchronization technology permits all of the various browsers operating on the devices 10, 12, and 14 of the synchronized session to simultaneously display the same web page and the same dynamic effects involving displayed software objects.

Figure 2:
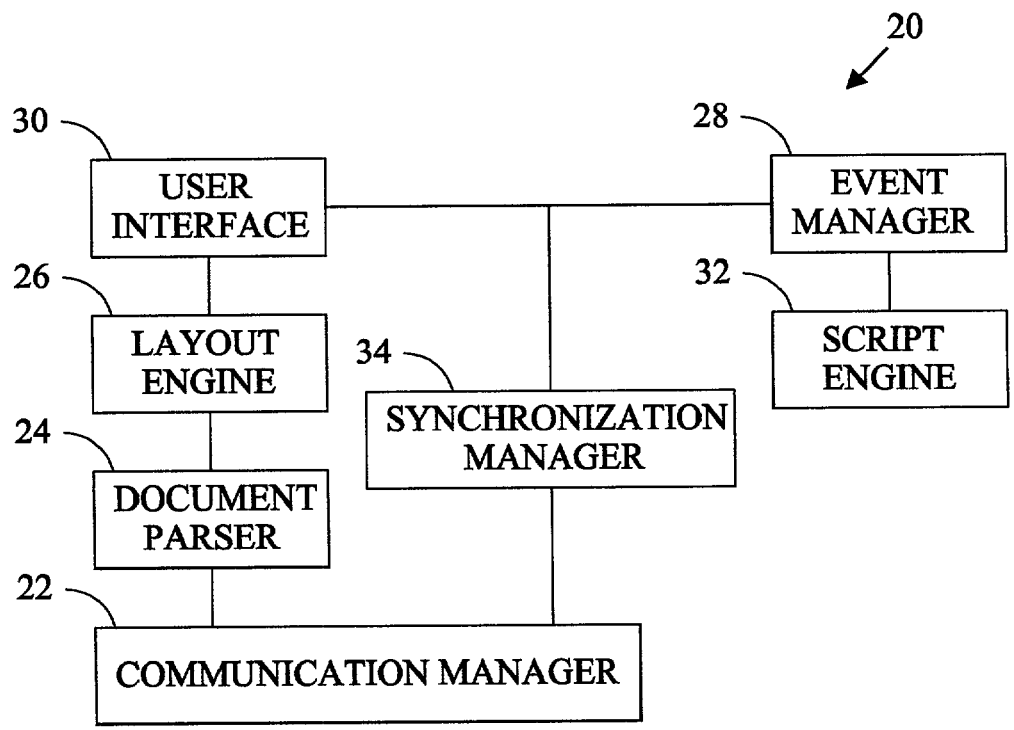
FIG. 2 is a block diagram of a web browser incorporating selective page synchronization.
Figure 3:
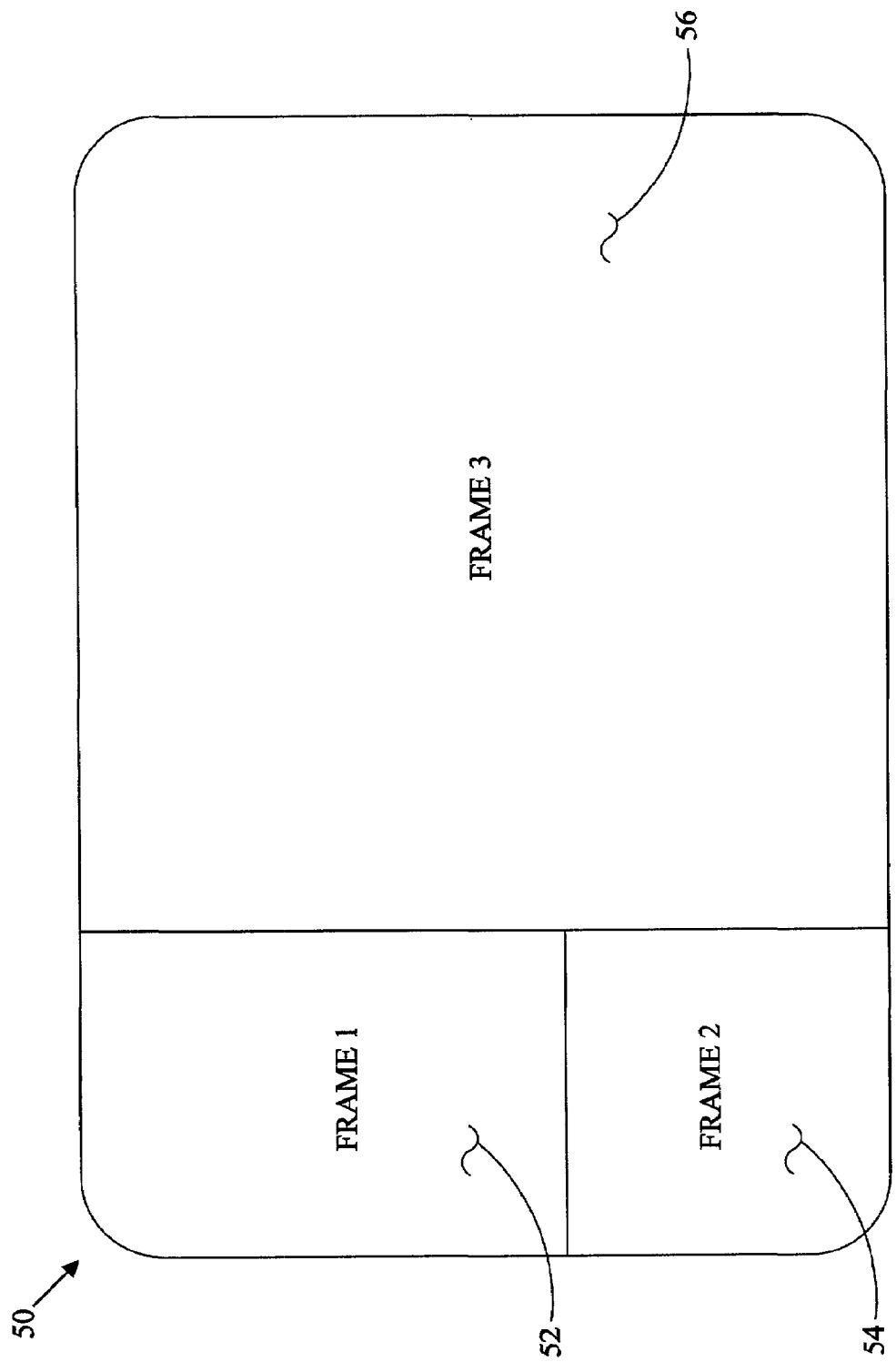
FIG. 3 is an illustration of an exemplary display of frames by a web browser.

Referring to FIG. 2, the web browser 20 useful for selective synchronized browsing includes facilities to fetch and display web pages and to communicate with the other browsers of the synchronized session. The web browser 20 includes a communication manager 22 to execute communication protocols necessary to communicate over the network 16. When a data file, in the form of a web page, is received from a web server (not illustrated) by the communication manager 22 a document parser 24 parses the elements of the file (e.g., tags, attributes, and scripts) and generates an intermediate form of the document. A layout engine 26 identifies objects comprising the page and determines the positions of the objects when displayed by a user interface 30. Hypertext Markup Language (HTML) supports the division of the browser display area 50 into a plurality of independent windows or frames 52, 54, and 56 each displaying a different web page as illustrated in FIG. 3. The multiple frames permit the web page designer to keep some information visible while other views are scrolled or replaced with new content. The frames of the display are defined by a frameset document that describes the dimensions, borders, initial content and other attributes of each of the frames comprising the display.

The layout engine 26 also determines if a displayed web page specifies an event in association with a displayed input object. An object comprises an item, including a page or a link, that can be selected and manipulated. An event is an action or occurrence that is generated by the browser 20 in response to an input producing an effect on an object. Events can be initiated by user actions, such as movement of the cursor or depression of a mouse button, or by an occurrence in the system, such as running out of memory. An association between an object and an event can be established with a script language, such as JavaScript; a browser plug in; a programming language, such as Java or Active X; or by a combination of these tools. For instance, JavaScript is a dynamic scripting language providing a list of events that can be associated with software objects by including a description of the event in the web document. For example, the JavaScript event attribute "onmouseover" can be used to initiate an action manipulating an object when the mouse pointer is moved to the location of the display specified in the attribute. The objects comprising the page and the events associated therewith are registered with an event manager 28. The event manager 28 controls the objects and the associated events and causes the user interface 30 to display the objects of the web page.

While a web page is displayed, the user interface 28 monitors input to determine if the user has performed an action initiating an event. For example, a user can request an event with a key stroke, movement of a mouse pointer, or a mouse click. If user input is detected, the user interface 30 transfers the input to the layout engine 26 which typically identifies the appropriate input object from the position of the mouse pointer at the time of the input. The layout engine 26 notifies the event manager 28 of the event corresponding to the user input and related input object. If the event is registered with the event manager 28 for the associated input object, the browser generates the event and begins to load a new page or otherwise manipulate an object as required by the attributes of the event. For example, if the event is specified in a script language, the script engine 32 is directed to execute the specified action.

Synchronized operation of a plurality of browsers is facilitated by a synchronization manager 34. Upon the occurrence of an event, such as loading a page, the layout engine 26 directs the synchronization manager 34 to send a synchronizing command to the other browsers of the session. The synchronization manager 34 formats a message identifying a URL (Uniform Resource Locator) for a page to be opened or noticing the occurrence of an event manipulating an object and identifying of the associated object. The synchronization manager 34 causes the communication manager 22 to broadcast the message to all other browsers participating in the session. The communication manager 22 of a browser receiving the notification, passes the message to the receiver's synchronization manager 34 which interprets the message and sends a command to the layout engine 26. The receiver's layout engine 26 invokes the action specified in the message and begins downloading the page or directs the manipulation of the associated object on the local display. A second user, viewing a display identical to that viewed by the first user, sees an effect on an event instigated by input of the first user replicated on the second display.

While synchronized display of a web page by a plurality of browsers facilitates collaboration, the present inventors realized that synchronization of all content for all participants in a session may not be desirable. For example, discussions between a sales person and a potential customer may be facilitated by the simultaneous display of a product specification. On the other hand, the sales person may also wish to refer to a confidential price list without having the document disclosed to the customer. If the price list is retrieved and displayed by the sales person's browser, page synchronization will cause the document to be displayed to the customer. On the other hand, it may be desirable for the sales person to open an explanatory document in a frame displayed by the remote customer's browser. However, page synchronization does not support the use of frames and does not permit the contents of a frame on one display to be properly displayed by a second browser of the session. The present inventors concluded that synchronized browsing could be enhanced if the location of an input triggering an action and the location of corresponding action could be specified. The inventors concluded that selective synchronization of web browser displays could be achieved by including in the description of an event, a location attribute specifying at least one of a local or a remote browser as a source of an input instigating the event or the site at which the effect on the object is to be produced.

For example, a web page designer may desire that an input by a first user at a local browser cause an action to occur only at a remote browser even though the two browsers are displaying the same web page. The following exemplary HTML coding includes a location attribute identifying the browser that is to display the action in response to an event generated by the local user's input:

```
<HTML>
<HEAD>
<TITLE>Test</TITLE>
</HEAD>
<BODY BGCOLOR="white">
<LAYER ID="text1" on_remote_mouseover="bgColor=
   'pink'"
on_remote_mouseout="bgColor='white'"
Move the mouse pointer here
</LAYER>
</BODY>
</HTML>
```

As indicated in the code, the background color (BGCOLOR) is to be changed to pink when the mouse pointer is moved to (mouseover) the text "Move the mouse pointer here." The JavaScript attribute "onmouseover" has been modified by the location attribute "on_remote_" to specify that the action is to occur only on the remote browsers of the session. Likewise, when the mouse pointer of the local browser is moved off the text the background color on the remote browsers returns to white (on_remote_mouseout= "bgColor='white'"). Referring to FIG. 4 location attributes "on_local_" 78 or "on_both_" 80 could be used to specify that the action is to occur only at the local browser or is to occur at both the local and remote browsers, respectively.

FIG. 4 is a table listing exemplary location attributes 72 and corresponding function descriptions 74. In addition, the table lists existing attributes 78, such as the attributes "onmousedown" and "onmouseover" whose operation is modified by the location attribute 72. For example, the location attribute "on_remote_" 82 can be used to modify one of the existing attributes, such as "onmouseover" to cause the effect to occur on a remote browser in response to the movement of the mouse pointer over the associated object. The location attribute "wcurser='originator'" 84 permits the web page designer to specify the location of the action that initiates the loading of a web page. For example, a lecturer could present a page for review on a group of browsers by selecting a hyperlink on the lecturer's browser with the location attribute "wcurser=teacher" if the lecturer's browser has the specified property "teacher." When the attribute is detected the browser compares a property identifying the browser with the identity of the originator specified by the attribute. The location attributes "remote_target='frame_name'" 86 and "local_target='frame_name'" 88 permits a web page to specify either the remote or local browser and a target frame on the specified browser as the location of a web page to be loaded. For example, a sales person might desire to illustrate a point in a presentation by causing a page with product details to be opened in a frame on the customer's browser. The following code identifies the new page to be opened "details.html," the location at which the page is to be loaded (frame one displayed by the remote browser), and the originator of the action (the browser having the property "agent"):

<A HREF="details.html" remotetarget="Frame1" wcurser="agent">

The location attribute "wc=" 90 permits identification of browsers (local, remote, or both) loading a web page to specified in the hyperlink to the new page.

Figure 5:
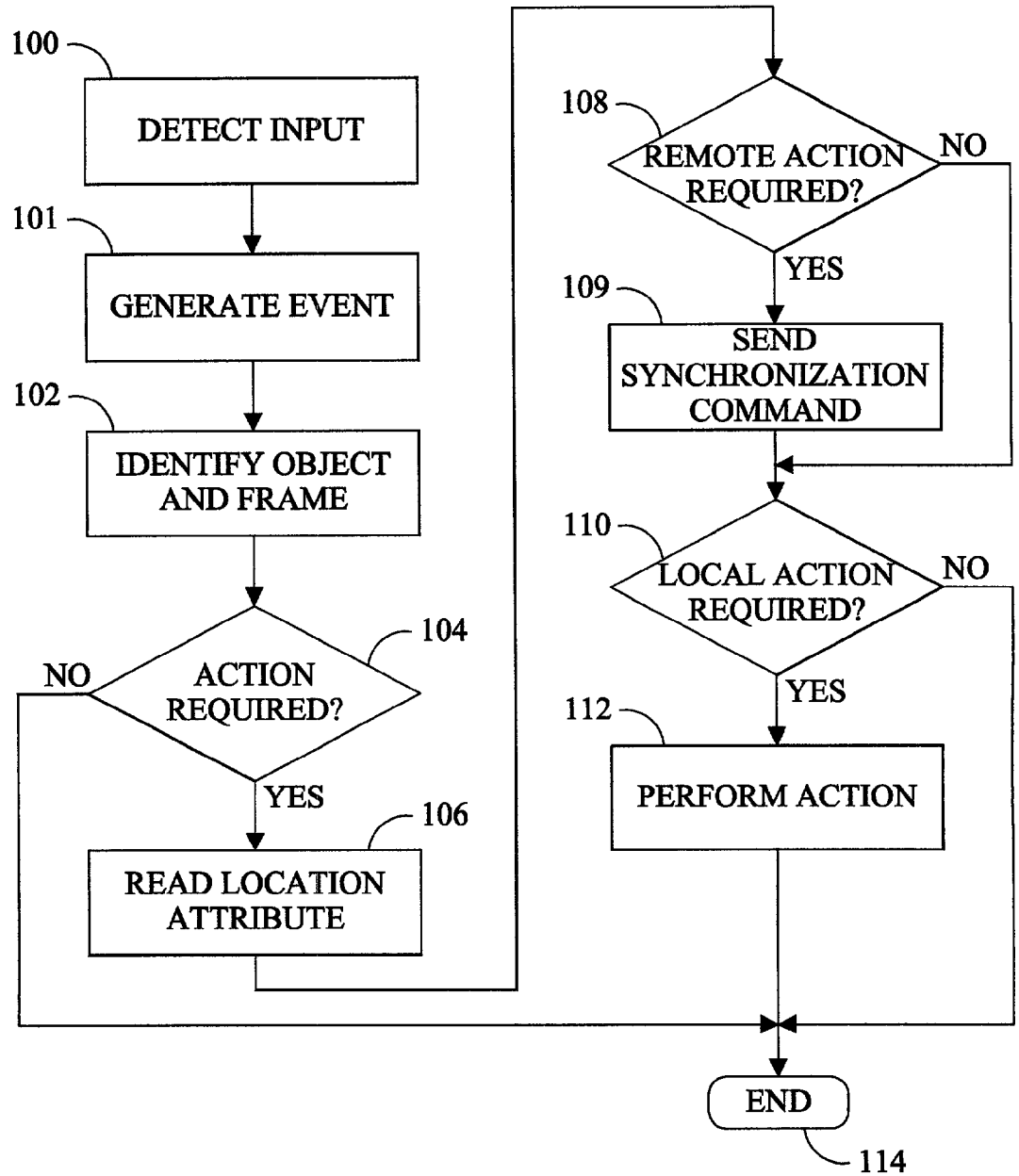
FIG. 5 is a flow diagram of the selective synchronization method of the present invention.

Referring to FIG. 5, when the user interface 30 of the browser 20 of the present invention detects an input 100 related to a displayed or input object, the interface transfers the input to the layout engine 26 to generate an event 101 and identify the associated object and the frame in which the object is located 102. The layout engine 26 notifies the event manager 28 of the input. The event manager 28 determines if action is required 104 by determining if the event is registered for the detected input object. If the event is not registered for the object, no action is required and the process ends 114. If the event is registered for the object, the browser reads the location attribute 106 (for example, "on_remote_") and determines whether action is required at the remote browsers of the session 108. If action at the remote browsers of the session is required, the synchronization manager 34 is notified and a synchronization command is formatted and sent by the communication manager 22 to the remote browsers 109 to initiate the action. The synchronization manager 34 of a browser receiving the synchronization command directs the browser to download the required page or perform the required manipulation of the associated object. The local browser then determines if local action is specified by the location attribute for the event 110. If local action is specified by the location attribute (such as "on_local_" or "on_both_"), the local browser downloads the appropriate page or performs the dynamic effect 112 before completion 114 of the process. If local action is not specified by the location attribute (such as, "on_remote_") associated with the event, the process ends 114 without action by the local browser 112.

Selective synchronization of a plurality of browsers engaged in a synchronized session permits more meaningful participation by the session members. There are many situations where some but not all members of the group wish to see information or where it is desirable to present information to a limited part of the group. The browser of the present invention permits web page designers to identify the originator and the recipients of synchronized web activities.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method comprising the steps of:
    (a) detecting an input associated with an object in a shared display of a web browser:
    (b) detecting a location attribute associated with said object, said location attribute comprising at least one of:
        (i) a function conditioning the occurrence of an event on the location of said input; and
        (ii) a function limiting the location at which an event is to be presented;
    (c) producing an effect based on said location attribute;
    (d) sending a synchronization command from a first web browser to a second web browser in response to detection of said location attribute specifying said second web browser as said location for said effect; and
    (e) producing said effect at said second browser in response to said synchronization command.

2. The method of claim 1 where said step of producing said effect comprises the step of loading a web page on a remote web browser.

3. The method of claim 2 further comprising the step of loading said web page on a local web browser at which said input was detected.

4. The method of claim 3 wherein said remote web browser and said local web browser are engaged in a synchronized display session.

5. The method of claim 1 where said step of producing said effect comprises the step of dynamically altering said object as displayed by a remote web browser.

6. The method of claim 1 further comprising the step of dynamically altering said object as displayed on a local web browser at which said input was detected.

7. The method of claim 6 where said remote web browser and said local web browser are engaged in a synchronized display session.

8. The method of claim 1 where said effect comprises loading a web page in a frame specified by said location attribute.

9. The method of claim 8 where said frame is displayed by said first web browser.

10. A method comprising the steps of:
    (a) detecting an input associated with an object in a shared display of a web browser;
    (b) detecting a location attribute associated with said object, said location attribute comprising at least one of:
        (i) a function conditioning the occurrence of an event on the location of said input; and
        (ii) a function limiting the location at which an event is to be presented;
    (c) producing an effect based on said location attribute;
    (d) sending a synchronization command from a first web browser to a second web browser in response to detection of said location attribute specifying said first web browser as a location for said input; and
    (e) producing said effect on at least one of said first and said second web browsers.

11. The method of claim 10 wherein said step of sending said synchronization command from said first web browser to said second web browser comprises the steps of:
  (a) detecting said location attribute where said location attribute specifies a property to be associated with a source of said input;
  (b) confirming that said web browser at which said input was detected has said property specified by said location attribute; and
  (c) sending said synchronization command to said second web browser in response to said confirmation.

12. The method of claim 11 further comprising the step of loading a web page at second web browser in response to said synchronization command.

13. The method of claim 11 further comprising the step of loading a web page in a frame displayed by said second web browser in response to said synchronization command.

14. The method of claim 11 further comprising dynamically altering an object displayed by said second web browser in response to said synchronization command.

15. The method of claim 14 further comprising the step of dynamically altering an object displayed by said first web browser in response to said location attribute.

16. A method comprising the steps of:
  (a) detecting an input at a local web browser;
  (b) generating an event in response to said input;
  (c) detecting at least one location attribute associated with said event, said location attribute comprising at least one of:
    (i) a function conditioning the occurrence of an action manipulating a shared object on the location of said input; and
    (ii) a function limiting the location at which an action manipulating a shared object is to be presented; and
  (d) executing said action to manipulate said shared object based on said location attribute;
  (e) registering an association of said event and an input object;
  (f) detecting said input at a display location corresponding to said input object; and
  (g) confirming said association in response to said input; and
  (h) generating said event in response to said confirmation.

17. A method comprising the steps of:
  (a) detecting an input at a local web browser;
  (b) generating an event in response to said input;
  (c) detecting at least one location attribute associated with said event, said location attribute comprising at least one of:
    (i) a function conditioning the occurrence of an action manipulating a shared object on the location of said input; and
    (ii) a function limiting the location at which an action manipulating a shared object is to be presented; and
  (d) executing said action to manipulate said shared object based on said location attribute;
  (d) sending a synchronization command from a local web browser to a remote web browser in response to detection of a location attribute specifying said remote web browser as said location for said action; and
  (e) executing said action to manipulate said object at said remote web browser in response to said synchronization command.

18. The method of claim 17 further comprising the step of manipulating said object in a frame displayed by said remote web browser in response to detection of a location attribute of said event specifying a frame displayed by said remote browser.

19. The method of claim 18 wherein said action comprises loading a web page.

* * * * *